(12) United States Patent
Irie et al.

(10) Patent No.: US 10,500,660 B2
(45) Date of Patent: Dec. 10, 2019

(54) WIRE ELECTRIC DISCHARGE MACHINE PROVIDED WITH DISCONNECTION REPAIRING UNIT

(71) Applicant: FANUC Corporation, Yamanashi (JP)

(72) Inventors: Shouta Irie, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 700 days.

(21) Appl. No.: 14/745,503

(22) Filed: Jun. 22, 2015

(65) Prior Publication Data

US 2015/0367437 A1    Dec. 24, 2015

(30) Foreign Application Priority Data

Jun. 23, 2014 (JP) .................... 2014-128214

(51) Int. Cl.
*B23H 1/02* (2006.01)
*B23H 7/10* (2006.01)
*B23H 7/04* (2006.01)

(52) U.S. Cl.
CPC ............ *B23H 1/024* (2013.01); *B23H 7/102* (2013.01); *B23H 7/04* (2013.01)

(58) Field of Classification Search
CPC . B23H 7/02; B23H 1/04; B23H 7/065; B23H 7/20; G05B 19/40931
USPC ................ 219/69.12, 69.13, 69.18; 700/162
See application file for complete search history.

(56) References Cited

U.S. PATENT DOCUMENTS

| 4,350,864 A | * | 9/1982 | Janicke | B23H 7/10 219/69.12 |
| 4,366,359 A | * | 12/1982 | Yatomi | B23H 7/04 219/69.12 |
| 4,367,392 A | * | 1/1983 | Girardin | B23H 7/102 219/69.12 |
| 4,484,052 A | * | 11/1984 | Inoue | B23H 7/02 219/158 |
| 4,513,192 A | * | 4/1985 | Inoue | B23H 7/101 219/69.12 |

(Continued)

FOREIGN PATENT DOCUMENTS

| EP | 2340907 A2 | 7/2011 |
| EP | 2839915 A1 | 2/2015 |

(Continued)

OTHER PUBLICATIONS

Office Action dated Oct. 13, 2015, corresponding to Japanese Patent Application No. 2014-128214.

(Continued)

*Primary Examiner* — Jimmy Chou
(74) *Attorney, Agent, or Firm* — Hauptman Ham, LLP

(57) ABSTRACT

A wire electric discharge machine provided with a disconnection repairing unit includes a core-fixing-end-position storing unit for storing a core fixing end position of a depositing and accumulating operation machined most lately among positions at which the depositing and accumulating operation for machining wastes by a core fixing function ends in a machining shape currently being machined and a disconnection repairing unit for executing automatic connection between a disconnection position and the core fixing end position.

6 Claims, 8 Drawing Sheets

(56) References Cited

U.S. PATENT DOCUMENTS

| | | | | |
|---|---|---|---|---|
| 4,536,632 A * | 8/1985 | Inoue | B23H 7/101 | 219/69.12 |
| 4,539,459 A * | 9/1985 | Yamagata | B23H 7/101 | 219/69.12 |
| 4,544,819 A * | 10/1985 | Nomura | B23H 7/06 | 219/69.12 |
| 4,598,190 A * | 7/1986 | Balleys | B23H 7/04 | 219/69.12 |
| 4,608,478 A * | 8/1986 | Aso | B23H 7/10 | 204/206 |
| 4,652,716 A * | 3/1987 | Schneider | B23H 7/102 | 219/69.12 |
| 4,746,782 A * | 5/1988 | Weber | B23H 7/02 | 219/69.12 |
| 4,808,787 A * | 2/1989 | Futamura | B23H 7/02 | 219/69.12 |
| 4,818,848 A * | 4/1989 | Obara | B23H 7/102 | 219/69.12 |
| 4,843,203 A * | 6/1989 | Gamo | B23H 7/065 | 219/69.12 |
| 4,894,504 A * | 1/1990 | Truty | B23H 7/04 | 219/69.12 |
| 4,940,871 A * | 7/1990 | Watanabe | B23H 7/065 | 219/69.12 |
| 4,973,812 A * | 11/1990 | Aramaki | B23H 7/06 | 219/69.12 |
| 4,978,828 A * | 12/1990 | Umetsu | B23H 7/10 | 219/69.12 |
| 4,990,738 A * | 2/1991 | Taneda | B23H 7/10 | 219/69.12 |
| 4,999,473 A * | 3/1991 | Gamo | B23H 7/102 | 219/69.12 |
| 5,001,321 A * | 3/1991 | Iwasaki | B23H 7/102 | 219/69.12 |
| 5,006,692 A * | 4/1991 | Magara | B23H 7/102 | 219/69.12 |
| 5,006,693 A * | 4/1991 | Obara | B23H 7/04 | 219/69.12 |
| 5,012,063 A * | 4/1991 | Kawanabe | B23H 7/06 | 219/69.12 |
| 5,015,814 A * | 5/1991 | Morishita | B23H 7/02 | 219/69.12 |
| 5,019,684 A * | 5/1991 | Ito | B23H 7/04 | 219/69.12 |
| 5,036,174 A * | 7/1991 | Iwasaki | B23H 7/10 | 219/69.12 |
| 5,043,550 A * | 8/1991 | Sakaue | B23H 7/065 | 219/69.12 |
| 5,045,662 A * | 9/1991 | Yamada | B23H 7/10 | 219/69.12 |
| 5,077,457 A * | 12/1991 | Onaka | B23H 7/10 | 219/69.12 |
| 5,086,203 A * | 2/1992 | Kobayashi | B23H 7/06 | 219/69.11 |
| 5,113,051 A * | 5/1992 | Sakaue | B23H 7/101 | 219/69.12 |
| 5,126,524 A * | 6/1992 | Moro | B23H 7/105 | 219/69.12 |
| 5,128,505 A * | 7/1992 | Matter | B23H 7/101 | 219/69.12 |
| 5,130,508 A * | 7/1992 | Umetsu | B23H 7/10 | 140/139 |
| 5,142,116 A * | 8/1992 | Yokomichi | B23H 7/10 | 219/69.12 |
| 5,233,147 A * | 8/1993 | Magara | B82Y 15/00 | 219/69.12 |
| 5,242,555 A * | 9/1993 | Buhler | B23H 7/06 | 204/297.06 |
| 5,276,301 A * | 1/1994 | Kohsaka | B23H 7/04 | 219/69.12 |
| 5,288,966 A * | 2/1994 | Kawanabe | B23H 7/10 | 219/69.12 |
| 5,302,796 A * | 4/1994 | Kuriki | B23H 7/10 | 219/69.12 |
| 5,362,936 A * | 11/1994 | Ishibashi | B23H 7/04 | 219/69.12 |
| 5,451,737 A * | 9/1995 | Bertholds | B23H 7/02 | 219/69.12 |
| 5,573,681 A * | 11/1996 | Ishibashi | B23H 7/065 | 219/69.12 |
| 5,603,851 A * | 2/1997 | Noda | B23H 7/102 | 219/69.12 |
| 5,744,775 A * | 4/1998 | Yasuda | B23H 7/04 | 219/69.12 |
| 5,753,880 A * | 5/1998 | Kajitori | B23H 7/102 | 219/69.12 |
| 5,756,956 A * | 5/1998 | Sato | B23H 7/04 | 219/69.18 |
| 5,859,401 A * | 1/1999 | Kajitori | B23H 7/02 | 219/69.12 |
| 5,874,702 A * | 2/1999 | Hayakawa | B23H 1/10 | 219/69.12 |
| 6,028,282 A * | 2/2000 | Toyonaga | B23H 7/104 | 219/69.12 |
| 6,184,485 B1 * | 2/2001 | Day | B23H 7/065 | 219/69.12 |
| 6,278,075 B1 * | 8/2001 | Kamiguchi | B23H 7/04 | 219/69.12 |
| 6,320,151 B1 * | 11/2001 | Angelella | B23H 7/04 | 219/69.12 |
| 6,344,624 B1 * | 2/2002 | Moro | B23H 7/02 | 219/69.12 |
| 6,403,911 B1 * | 6/2002 | Shih | B23H 7/102 | 219/69.12 |
| 6,552,291 B1 * | 4/2003 | Kobayashi | B23H 7/101 | 219/69.12 |
| 6,744,002 B1 * | 6/2004 | Goto | B23H 7/02 | 219/69.12 |
| 6,781,080 B1 * | 8/2004 | Sato | B23H 7/04 | 219/69.12 |
| 6,815,630 B1 * | 11/2004 | Ishihara | B23H 7/108 | 219/69.12 |
| 6,832,126 B2 * | 12/2004 | Irie | B23H 7/065 | 219/69.11 |
| 8,003,911 B2 * | 8/2011 | Onodera | B23H 7/04 | 219/69.12 |
| 8,525,063 B2 * | 9/2013 | Yamazaki | B23H 1/02 | 219/69.12 |
| 8,586,891 B2 * | 11/2013 | Hashimoto | B23H 7/107 | 219/69.12 |
| 8,759,708 B2 * | 6/2014 | Inaba | B23H 7/102 | 219/69.12 |
| 8,975,554 B2 * | 3/2015 | Kawahara | B23H 1/022 | 219/69.12 |
| 9,085,038 B2 * | 7/2015 | Inaba | B23H 1/10 | |
| 2001/0007319 A1 * | 7/2001 | Moro | B23H 7/101 | 219/69.12 |
| 2001/0014411 A1 * | 8/2001 | Seong | B21C 37/042 | 428/613 |
| 2001/0025831 A1 * | 10/2001 | Kobayashi | B23H 7/02 | 219/69.12 |
| 2002/0128743 A1 * | 9/2002 | Kurihara | B23H 7/04 | 700/162 |
| 2003/0010753 A1 * | 1/2003 | Yamada | B23H 7/102 | 219/69.12 |
| 2004/0060907 A1 * | 4/2004 | Takeyama | B23H 7/102 | 219/69.12 |
| 2004/0178179 A1 * | 9/2004 | Ogata | G05B 19/4093 | 219/69.12 |
| 2004/0193306 A1 * | 9/2004 | Kurihara | B23H 7/04 | 700/162 |
| 2005/0145603 A1 * | 7/2005 | Goto | B23H 7/04 | 219/69.12 |
| 2005/0269296 A1 * | 12/2005 | Arakawa | B23H 7/04 | 219/69.12 |
| 2006/0065637 A1 * | 3/2006 | Kita | B23H 7/107 | 219/69.12 |

(56) References Cited

U.S. PATENT DOCUMENTS

| | | | |
|---|---|---|---|
| 2006/0091113 A1* | 5/2006 | Hiraga | B23H 7/04 219/69.12 |
| 2007/0156278 A1* | 7/2007 | Hiraga | G05B 19/406 700/184 |
| 2007/0228016 A1* | 10/2007 | Kita | B23H 7/104 219/69.12 |
| 2008/0053963 A1* | 3/2008 | Kita | B23H 7/104 219/69.12 |
| 2008/0110865 A1* | 5/2008 | Hashimoto | B23H 1/022 219/69.12 |
| 2008/0142487 A1* | 6/2008 | Sakaguchi | B23H 7/102 219/69.12 |
| 2008/0217300 A1* | 9/2008 | Kita | B23H 7/104 219/69.12 |
| 2008/0277383 A1* | 11/2008 | Sandlin | B23H 1/10 219/69.12 |
| 2009/0101627 A1* | 4/2009 | Kawahara | B23H 7/04 219/69.12 |
| 2009/0194511 A1* | 8/2009 | Luo | B23H 7/02 219/69.12 |
| 2010/0187203 A1* | 7/2010 | Bamberg | B23H 1/028 219/69.12 |
| 2010/0199909 A1* | 8/2010 | Bamberg | B22F 8/00 117/13 |
| 2012/0031879 A1* | 2/2012 | Abe | B23H 7/065 219/69.12 |
| 2012/0138576 A1* | 6/2012 | Chuang | B23H 7/02 219/69.12 |
| 2012/0193326 A1* | 8/2012 | Mitsuyasu | B23H 7/04 219/69.17 |
| 2012/0223055 A1* | 9/2012 | Kawahara | B23H 7/065 219/69.12 |
| 2012/0292292 A1* | 11/2012 | Lin | B23H 5/02 219/69.12 |
| 2012/0305530 A1* | 12/2012 | Inaba | B23H 7/102 219/69.12 |
| 2013/0186865 A1* | 7/2013 | Yamaoka | B23H 1/04 219/69.12 |
| 2013/0193112 A1* | 8/2013 | Murai | B23H 1/024 219/69.12 |
| 2013/0193113 A1* | 8/2013 | Nakajima | B23H 1/00 219/69.12 |
| 2013/0206731 A1* | 8/2013 | Takahashi | B23H 7/20 219/69.12 |
| 2013/0220979 A1* | 8/2013 | Yamaoka | B23H 1/02 219/69.12 |
| 2013/0240486 A1* | 9/2013 | Yamada | B23H 7/104 219/69.12 |
| 2013/0248494 A1* | 9/2013 | Inaba | B23H 1/10 219/69.12 |
| 2013/0341305 A1* | 12/2013 | Tsukamoto | B23H 7/36 219/69.12 |
| 2014/0014625 A1* | 1/2014 | Yamaoka | B23H 1/04 219/69.12 |
| 2014/0144885 A1* | 5/2014 | Onodera | B23H 7/104 219/69.12 |
| 2014/0197138 A1* | 7/2014 | Yoshizaki | B23H 7/065 219/69.12 |
| 2014/0203000 A1* | 7/2014 | Mitsuyasu | B23H 7/38 219/124.21 |
| 2014/0284311 A1* | 9/2014 | Yoshida | B23H 1/024 219/69.12 |
| 2014/0291295 A1* | 10/2014 | Kasai | B23H 7/065 219/69.12 |
| 2014/0305908 A1* | 10/2014 | Nakajima | B23H 7/108 219/69.12 |
| 2014/0319101 A1* | 10/2014 | Nakajima | B23H 7/102 219/69.12 |
| 2014/0374385 A1* | 12/2014 | Kawano | B23H 7/04 219/69.12 |
| 2015/0053650 A1* | 2/2015 | Miyake | B23H 9/00 219/69.12 |
| 2015/0129558 A1* | 5/2015 | Otomo | B23H 7/36 219/69.12 |
| 2015/0144599 A1* | 5/2015 | Kouda | F16C 33/6681 219/69.12 |
| 2015/0202704 A1* | 7/2015 | Yoshida | B23H 7/101 219/69.12 |
| 2015/0231716 A1* | 8/2015 | Yamazaki | B23H 1/024 219/69.12 |
| 2015/0290733 A1* | 10/2015 | Nakagawa | B23H 7/104 219/69.12 |
| 2015/0367437 A1* | 12/2015 | Irie | B23H 1/024 219/69.11 |
| 2016/0023291 A1* | 1/2016 | Inoue | B23H 1/02 219/69.12 |
| 2016/0039025 A1* | 2/2016 | Nishikawa | B23H 1/024 219/69.12 |
| 2016/0039029 A1* | 2/2016 | Hasegawa | B23H 7/16 219/69.12 |
| 2016/0045966 A1* | 2/2016 | Hasegawa | B23H 1/024 219/69.12 |
| 2016/0074950 A1* | 3/2016 | Sasaki | B23H 7/36 219/69.12 |
| 2016/0089715 A1* | 3/2016 | O'Keeffe | B22D 17/04 164/113 |
| 2016/0136745 A1* | 5/2016 | Hasegawa | B23H 7/20 219/69.12 |
| 2016/0184911 A1* | 6/2016 | Masuda | B23H 1/02 219/69.12 |

FOREIGN PATENT DOCUMENTS

| | | |
|---|---|---|
| EP | 2684633 A3 * | 1/2018 |
| JP | 56-95540 A | 8/1981 |
| JP | 2-145215 A | 6/1990 |
| JP | 8-309622 A | 11/1996 |
| JP | 2000-135626 A | 5/2000 |
| JP | 2000-141132 A | 5/2000 |
| JP | 2011-136409 A | 7/2011 |
| JP | 2012-166332 A | 9/2012 |
| JP | 2013-144335 A | 7/2013 |
| JP | 2014-14907 A | 1/2014 |
| JP | 2014-24132 A | 2/2014 |
| WO | 2013/157373 A1 | 10/2013 |

OTHER PUBLICATIONS

Extended European Search Report in EP Application No. 15172256.8 dated Oct. 26, 2015.

* cited by examiner

```
O0100 (SQUARE)
N101 G92X0Y0
N102 G90G01Y-10.
N103 X-10.
N104 M100
N105 Y10.
N106 X10.
N107 M100
N108 Y-10.
N109 X0.
N110 Y0.
N111 M30
```

WIRE ELECTRIC DISCHARGE MACHINE PROVIDED WITH DISCONNECTION REPAIRING UNIT

RELATED APPLICATIONS

The present application claims priority to Japanese Application Number 2014-128214, filed Jun. 23, 2014, the disclosure of which is hereby incorporated by reference herein in its entirety.

BACKGROUND OF THE INVENTION

1. Field of the Invention

The present invention relates to a wire electric discharge machine provided with a disconnection repairing unit for performing disconnection repairing operation while monitoring a position of a core fixing section considering the fact that connection is disabled when the wire electrode reaches a core fixing portion while retracting in a machining route, for the purpose of performing a disconnection repairing operation for repairing disconnection of the wire electrode, when disconnection of the wire electrode occurs during machining using a function of fixing a core to a workpiece (hereinafter referred to as a core fixing function).

2. Description of the Related Art

Conventionally, there have been devised wire electric discharge machines including various core fixing functions. The core fixing function is a function for performing a core fixing, that is, a function for, by making use of an adhesion phenomenon of component particles of a wire electrode in a wire electric discharge machine to a work piece, accumulating a deposit including the component particles of the wire electrode in a machining groove of the workpiece to fix a core and the workpiece.

The core fixed to the workpiece by the deposit can be removed from the workpiece by applying an external force to the core through striking or the like. Therefore, conventional processes such as setting a residual stock removal section in a machining shape, performing electric discharge machining, and electric-discharge machining the residual stock removal section again after the end of the machining to cut off the core can be omitted. It is therefore possible to reduce a machining time and improve machining efficiency.

The core fixing function will now be explained with reference to an NC program for machining a workpiece. FIG. 8 is a program example in operating the core fixing function according to a command of the NC program. The core fixing function of the wire electric discharge machine is operated according to the command of the NC program. Note that a command code for operating the core fixing function is represented as M100. A core fixing distance is set to 2 mm.

When the program example (O0100) shown in FIG. 8 is executed, a machining result shown in FIG. 9 is obtained. FIG. 9 is a diagram showing an example of the machining result obtained when the core fixing function is operated according to the command of the NC program. Machining of a workpiece 40 is started from a machining start hole 41. A wire electrode machines a machining route 42 commanded by the program to form a machining groove 43.

When M100 is commanded in a block N104 and a block N107, the core fixing function is enabled. The machining advances while accumulating a deposit. A portion where the deposit is accumulated is referred to as a core fixing section 45. The core fixing section 45 is in a state in which the machining groove is filled with the deposit.

When the machining advances 2 mm in a state in which the core fixing function is enabled, the core fixing function is disabled. The machining advances while forming the machining groove again. The program ends in a block N111. At this point, the workpiece 40 and a core 44 are fixed by the core fixing section 45.

The core 44 can be removed by applying an external force to the core 44 by hitting the core 44 with a hammer or the like. Conventionally, as shown in FIG. 10, work for providing a residual stock removal section 51 in a machining shape, performing electric discharge machining, and electric-discharge machining the residual stock removal section 51 again in a later process to cut off the core 44 is performed. However, since the process can be omitted, it is possible to reduce a machining time and improve machining efficiency.

It is now assumed that disconnection occurs during machining performed using a core retaining function of the wire electric discharge machine. FIG. 11 is a diagram for explaining disconnection repairing performed using the core fixing function. A wire electrode is disconnected in a disconnection position 47. The wire electrode travels backward on the machining route for connection in an automatic connection position 48 (see an arrow of reference numeral 50). When the core fixing section 45 is not formed, the wire electrode travels backward from the disconnection position 47 to the automatic connection position 48 on the machining route as indicated by reference sign 50a and performs a connection operation and, moving to the disconnection position 47 along the machining route after the connection, then the machining is resumed.

As a function of automatically repairing disconnection and resuming machining when the disconnection occurs during the machining, various functions have been devised. FIGS. 12A, 12B, and 12C are diagrams showing disconnection repairing by the conventional disconnection repairing unit.

As shown in FIG. 12A, there has been devised a method of (1) returning to the machining start hole and automatically connecting the wire electrode, returning to a position where the wire electrode is disconnected on the machining route (hereinafter referred to as a disconnection position) along the machining route, and resuming the electric discharge machining from the disconnection position of the wire electrode. As shown in FIG. 12B, there has been devised a method of automatically connecting the wire electrode in an intermediate position between the disconnection position of the wire electrode and a start point of a machining block in which the disconnection of the wire electrode occurs, returning to the disconnection position along the machining route, and resuming the electric discharge machining from the disconnection position of the wire. As shown in FIG. 12C, there has been devised a method of moving to a position machined most lately among intersections of a circle having a radius drawn around the disconnection position and the machining route and automatically connecting the wire electrode, returning to the disconnection position along the machining route, and resuming the electric discharge machining from the disconnection position of the wire electrode. All the methods are methods of, after performing the automatic connection, returning to the disconnection position along the machining route and resuming the electric discharge machining from the disconnection position of the wire.

Patent Literatures disclosing techniques of the wire electric discharge machine including the core fixing function will be explained.

Japanese Patent Laid-Open No. 2012-166332 discloses a workpiece cutoff machining method of preventing a drop of a cutout object from a work piece, breaking a welding section with an external force and cutting off the cutout object without machining a residual stock removal section with electric discharge machining again, and reducing a machining time and improving machining efficiency.

Japanese Patent Laid-Open No. 2014-24132 discloses a machining program editing method of analyzing a machining program for the plate thickness of a workpiece, the number of machining members, and the specific gravity of the machining members, calculating a machining peripheral length of the machining members and an upper surface area of the shape of the machining members to calculate the mass of the machining members, and, concerning a relation between welding lengths of a retainable welding section to the workpiece of the machining members, calculating, from a map of a measurement value of a controller memory, a predetermined welding length and welding places of the retainable welding section corresponding to the mass of the machining members.

Japanese Patent Laid-Open No. 2014-14907 discloses a wire electric discharge machine and an automatic programming apparatus for the wire electric discharge machine that can optionally set places where a necessary minimum amount of a deposit is accumulated in order to fix a core to a work thin material.

Japanese Patent Laid-Open No. 2013-144335 discloses a machining program generating apparatus for a wire electric discharge machine for setting a deposit region from the shape and the weight of a core and generating a machining program on the basis of the deposit region.

Japanese Patent Laid-Open No. 2011-136409 discloses a disconnection repairing apparatus in wire electric discharge machining in which a wire electrode moves to a position machined most lately among intersections of a circle having a radius drawn around a disconnection position and a machining route and automatic connection of the wire electrode can be performed.

Japanese Patent Laid-Open No. 8-309622 discloses a disconnection repairing method of automatically connecting a wire electrode in an intermediate position between a disconnection position of the wire electrode and a start point of a block in which disconnection of the wire electrode occurs and resuming electric discharge machining.

Japanese Patent Laid-Open No. 2-145215 discloses an automatic wire supplying method of automatically connecting a wire in a disconnection position of a wire electrode or a position a small distance back from the disconnection position of the wire electrode along a machining track and resuming electric discharge machining.

Japanese Patent Laid-Open No. 56-95540 discloses a wire electric discharge machining method of, when wire disconnection occurs during machining, moving to a machining start hole, performing wire automatic supply with an apparatus for automatically supplying a wire electrode, moving to a disconnection point along an original machining track, and resuming machining from the disconnection point and a wire electric discharge machining method of stopping machining when the number of times of occurred wire disconnection is equal to or larger than the designated number of times in the same machining hole and shifting to the next machining.

In the case of the machining performed using the core fixing function as explained in the background, connection cannot be performed because the deposit is accumulated in the machining groove in the core fixing section 45 (FIG. 11, the moving route 50b to the connection position). After the wire electrode passes the core fixing section 45 and the connection is completed, if the wire electrode reaches the core fixing section 45 when returning to the disconnection position along the machining route, since the deposit is accumulated in the machining groove 43 and the machining groove 43 is buried in the core fixing section 45, the wire electrode is caught by the deposit and disconnected (FIGS. 12A, 12B, and 12C, the route 49 returning to the disconnection position). Therefore, even if the wire electrode retracts beyond a terminal of the core fixing section 45 (hereinafter referred to as a core fixing end position 46) and the automatic connection is performed in disconnection repairing, the machining cannot be resumed.

In Japanese Patent Laid-Open No. 2012-166332, when disconnection of a wire electrode occurs in a welding process, it is possible to supply the wire electrode to a machining slit at a disconnection point and continuously perform a welding process or a machining process. This relates to a core fixing function for changing an electric machining condition halfway in machining, melting a part of the wire electrode and welding a workpiece and a core, and fixing the core to the workpiece. Concerning disconnection during a core fixing function operation, connection can be performed on the site and the machining can be continuously performed. However, there is no description concerning a repairing method of disconnection that occurs after the operation of the core fixing function ends.

In Japanese Patent Laid-Open No. 2014-24132, a machining program is analyzed to automatically calculate the length and the place of a core retaining portion. Like Japanese Patent Laid-Open No. 2012-166332, concerning disconnection during a core fixing function operation, connection can be performed on the site and the machining can be continuously performed. However, there is no description concerning a repairing method of disconnection that occurs after the operation of the core fixing function ends.

In Japanese Patent Laid-Open No. 2014-14907, a core fixing place is optionally set when a core fixing function is used. However, there is no description concerning a repairing method of disconnection that occurs after the operation of the core fixing function ends.

Japanese Patent Laid-Open No. 2013-144335 discloses a machining program generating apparatus for a wire electric discharge machine that can deposit components of a wire electrode on a core not via complicated work. However, there is no description concerning a repairing method of disconnection that occurs after the operation of the core fixing function ends.

In Japanese Patent Laid-Open No. 2011-136409, automatic connection is performed in a position on a machining route a certain distance apart from a disconnection position to reduce time for returning to the disconnection position from a connection position, eliminate disorder of a machining liquid flow, and improve a connection ratio. However, if a core fixing portion is present between the connection position and the disconnection position, disconnection occurs again in the return to the disconnection position.

In Japanese Patent Laid-Open No. 8-309622, automatic connection is performed in a machining groove in an intermediate position between a disconnection position and a start point of a block in which disconnection occurs and time until electric discharge machining resumption after the disconnection is reduced. However, like Japanese Patent Laid-Open No. 2011-136409, if the core fixing portion is present between the connection position and the disconnection position, disconnection occurs again in the return to the disconnection position.

In Japanese Patent Laid-Open No. 2-145215, when connection in a disconnection position is impossible, machining cannot be resumed by a method disclosed in the patent literature. The patent literature is different from this application for performing the automatic connection between the disconnection position and the core fixing section.

In Japanese Patent Laid-Open No. 56-95540, automatic connection is performed in a machining start hole. However, like Japanese Patent Laid-Open No. 2011-136409 and Japanese Patent Laid-Open No. 8-309622, if the core fixing section is present between the machining start hole and the disconnection position, disconnection occurs again in the return to the disconnection position. A condition for shifting to the next machining is that the number of times of disconnection of the wire is equal to or larger than the designated number of times. Therefore, the patent literature is different from the present invention, which checks presence or absence of the core fixing section and determines whether to make a shift to the next machining.

SUMMARY OF THE INVENTION

Therefore, in order to solve the problems of the related art explained above, it is an object of the present invention to provide a wire electric discharge machine that performs automatic connection on a machined machining route when disconnection occurs in machining performed using a core fixing function and a disconnection repairing operation is started. The automatic connection by the disconnection repairing is performed between a disconnection position and a core fixing end position.

A wire electric discharge machine provided with a disconnection repairing unit according to the present invention includes: a disconnection repairing unit for performing, when a wire electrode is disconnected during electric discharge machining, automatic connection on a machined machining route, returning to a position where a wire is disconnected along the machining route, and resuming the electric discharge machining from a disconnection position of the wire electrode, and configured to perform a core fixing by, electric-discharge machining of a workpiece with electric discharge generated between the wire electrode and the workpiece and depositing and accumulating machining wastes caused by the electric discharge machining to thereby fix a core generated by the electric discharge machining and the workpiece, and, machine the workpiece along the machining route while controlling the respective moving axes and calculating coordinates of the respective moving axes and a machining distance according to a machining program, and the wire electric discharge machine provided with a disconnection repairing unit includes, a core-fixing-end-position storing unit for storing a core fixing end position of a depositing and accumulating operation machined most lately among positions at which the depositing and accumulating operation for the machining wastes by the core fixing function ends in a machining shape currently being machined. The wire electric discharge machine executes automatic connection with the disconnection repairing unit between the disconnection position and the core fixing end position.

The disconnection repairing unit may include a core-fixing-end-position determining unit for determining whether the automatic connection position by the disconnection repairing unit is present between the disconnection position and the core fixing end position. When the core-fixing-end-position determining unit determines that the automatic connection position is present between the disconnection position and the core fixing end position, the disconnection repairing unit may execute the automatic connection.

The disconnection repairing unit may retract from the disconnection position along the machining route and perform the automatic connection and, when the connection cannot be performed, further repeat an operation for retracting along the machining route and performing the automatic connection.

When the core-fixing-end-position determining unit determines that the automatic connection position is absent between the disconnection position and the core fixing end position, the wire electric discharge machine may display an alarm.

When the core-fixing-end-position determining unit determines that the automatic connection position is absent between the disconnection position and the core fixing end position, when a connection command position is present ahead of a program position during disconnection, the wire electric discharge machine may skip the machining to the command position and resume the machining from the connection command position.

The core-fixing-end-position determining unit may include a disconnection-position storing unit for storing, when the wire electrode is disconnected during the electric discharge machining, a disconnection position on the machining route; and a retraction-position calculating unit for calculating a retraction position from the disconnection position when the retraction is performed along the machining route by the disconnection repairing unit. The core-fixing-end-position determining unit may determine, from the disconnection position, the core fixing end position, and the retraction position, whether the automatic connection position is present between the disconnection position and the core fixing end position.

The core-fixing-end-position determining unit may include a retraction-position storing unit for storing, as a retraction position, a position during retraction along the machining route by the disconnection repairing unit. The core-fixing-end-position determining unit may determine, from the core fixing end position and the retraction position, whether the automatic connection position is present between the disconnection position and the core fixing end position.

The present invention includes the components explained above. Therefore, it is possible to provide a wire electric discharge machine that performs automatic connection on a machined machining route when disconnection occurs in machining performed using a core fixing function and a disconnection repairing operation is started. The automatic connection by the disconnection repairing is performed between a disconnection position and a core fixing end position.

BRIEF DESCRIPTION OF THE DRAWINGS

The above-mentioned objects and characteristics and other objects and characteristics of the present invention will be made apparent from the following explanation of embodiments with reference to accompanying drawings. Among the drawings.

DETAILED DESCRIPTION OF THE PREFERRED EMBODIMENTS

Figure 1:
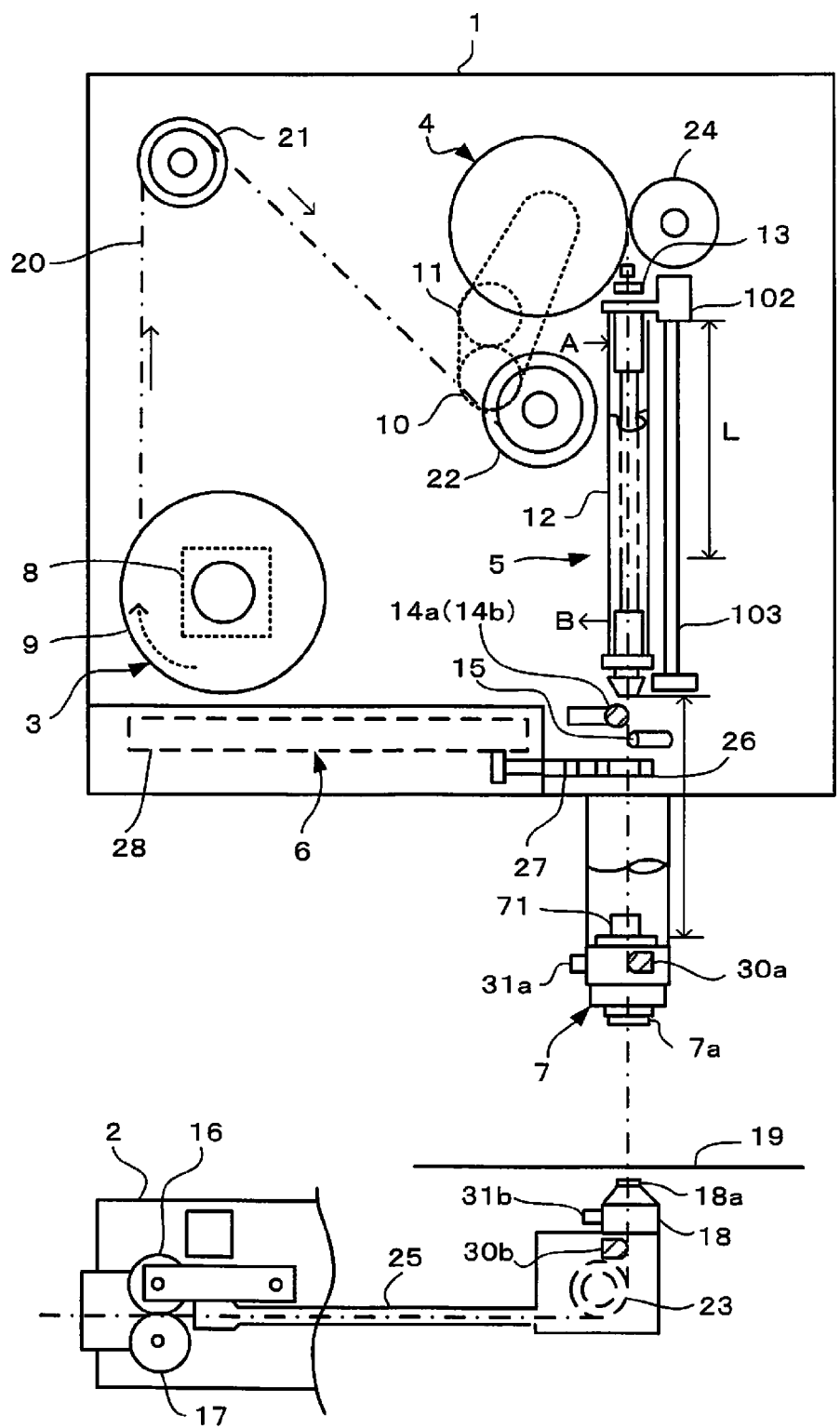
FIG. 1 is a diagram for explaining a main part of a wire electric discharge machine that performs a connection operation.

First, the configuration of a wire electric discharge machine for performing automatic connection will be explained. FIG. 1 is a diagram schematically showing a main part of the wire electric discharge machine that carries out a method of the present invention. The wire electric discharge machine shown in FIG. 1 has a core fixing function. An entire main body section of the wire electric discharge machine is roughly divided into two, i.e., an upper machine frame section 1 and a lower machine frame section 2 disposed to be opposed to each other. The sections 1 and 2 are attached to be relatively movable in the up-down direction by a not-shown column. This is because it is necessary to adjust, according to the thickness or the like of a work to be machined, an interval between an upper wire electrode guide 7 on a wire electrode feeding route upstream side and a lower wire electrode guide 18 on a wire electrode feeding route downstream side.

In the upper machine frame section 1, a wire electrode winding-up unit 3, a brake roller 4, a wire electrode fusing mechanism 5, a wire electrode draw-in unit 6, and the upper wire electrode guide 7 are disposed. A nozzle for jetting machining fluid to a machining region is provided in the upper wire electrode guide 7.

The wire electrode winding-up unit 3 includes a supply reel 9 coupled to a winding-up motor 8. The brake roller 4 is driven by a brake motor 10 capable of forwardly and reversely rotating via a timing belt, a powder clutch, and the like. Reference numeral 11 denotes a pulse coder that detects a rotation amount (a wire electrode movement amount) of the brake roller 4.

The wire electrode fusing mechanism 5 is configured by a wire electrode feed pipe structure 12 disposed above the upper wire electrode guide 7, a first electrode for wire electrode fusing 13 and a second electrode for wire electrode fusing (substantial wire fusing unit) 14b, which also functions as wire electrode distal end detecting unit 14a, disposed on an inlet side and an outlet side of the wire electrode feed pipe structure 12, and a press contact roller 15. The electrode for wire electrode fusing 14b and the press contact roller 15 are capable of moving away from and toward a traveling route of a wire electrode 20. That is, when being used as a wire electrode fusing unit or a wire electrode distal end detecting unit via energization control to a not-shown solenoid, the second electrode for wire electrode fusing 14b and the press contact roller 15 are moved to enter the traveling route of the wire electrode 20 in a long hole as shown in FIG. 1. During normal machining, the second electrode for wire electrode fusing 14b and the press contact roller 15 are moved away from the wire electrode 20.

In this embodiment, anneal action is performed by energizing the wire electrode 20 between the first electrode for wire electrode fusing 13 and the second electrode for wire electrode fusing 14b to heat the wire electrode 20 in a state in which cooling air is fed between A and B of the wire electrode feed pipe structure 12. In a position of the second electrode for wire electrode fusing 14b where the cooling air does not flow, the temperature of the wire electrode 20 suddenly rises compared with a portion where the cooling air flows. Therefore, the wire electrode 20 is fused in this position.

In the upper wire electrode guide 7, a machining upper electrode 30a is disposed to face a wire electrode passage. During electric discharge machining, energization for machining is performed between the machining upper electrode 30a and a machining lower electrode 30b. In the lower machine frame section 2, a wire electrode winding roller 17 and a pinch roller 16 and the lower wire electrode guide 18 opposed to the wire electrode winding roller 17 are disposed. In the lower wire electrode guide 18, a nozzle for jetting the machining fluid is provided. Reference numeral 19 denotes a table surface of the wire electric discharge machine. The machining lower electrode 30b is disposed to face a wire electrode passage in the lower wire electrode guide 18. Note that reference signs 31a and 31b denote intake ports of the machining fluid jetted to the machining region from the nozzles of the upper wire electrode guide 7 and the lower wire electrode guide 18. Reference numeral 18a denotes a lower nozzle.

The wire electrode 20 is drawn out from the supply reel 9, wound around turning rollers 21 and 22, and guided to the brake roller 4. The wire electrode 20 forms a wire electrode route that passes the position of the first electrode for wire electrode fusing 13, pierces through the wire electrode feed pipe structure 12 to reach the upper wire electrode guide 7, passes through the lower wire electrode guide 18, changes the direction in a turning roller 23, and reaches the wire electrode winding roller 17.

The wire electrode 20 is given predetermined back tension by the brake roller 4 driven by the brake motor 10 controlled by a constant current circuit (not shown in the figure). The wire electrode 20 travels according to pulling action of the wire electrode winding roller 17. The machining lower electrode 30b disposed in the lower wire electrode guide 18 comes into contact with the traveling wire electrode 20 together with the machining upper electrode 30a and supplies electric power for machining to the wire electrode 20.

During normal traveling (during electric discharge machining) of the wire electrode 20, the winding-up motor 8 of the supply reel 9 is idled in a reverse direction (a broken line arrow). A grip section 26 is in an open state during the normal traveling of the wire electrode 20 and does not come into contact with the wire electrode 20. Reference numeral 24 denotes a pinch roller. The pinch roller 24 comes into contact with a circumferential surface of the brake roller 4 to ensure the contact of the wire electrode 20 and the brake roller 4. Reference numeral 25 denotes a guide pipe. The guide pipe 25 is disposed between the turning roller 23 and the wire electrode winding roller 17 in the lower machine frame section 2. The wire electrode 20 is pierced through the guide pipe 25. The wire electrode draw-in unit 6 is configured by an arm 27 provided with the grip section 26 at the distal end and an air cylinder 28 that draws in the arm 27. The grip section 26 at the distal end is located on the downstream side of the press contact roller 15. The wire electrode draw-in unit 6 is substantial wire electrode removing unit.

The wire electrode feed pipe structure 12 includes a water guide section and a water discharge section not shown in the figure in positions respectively indicated by arrows A and B. As explained above, anneal is performed between A and B during fusing of the wire electrode 20. The wire electrode 20 is fused in the position of the second electrode for wire electrode fusing 14b.

The wire electrode feed pipe structure 12 is a structure entirely electrically insulated from the wire electrode 20. Further, the wire electrode feed pipe structure 12 is supported by a slide member 102 together with the first electrode for wire electrode fusing 13. The slide member 102 is driven to rise and fall by a driving unit (not shown) along a column guide 103 between an uppermost position shown in the figure and a positioning section 71 formed in the upper wire electrode guide 7 (a distance L). This mechanism is used during automatic connection.

The wire electric discharge machine explained above has a core fixing function for performing, when the wire electrode is disconnected during electric discharge machining, automatic connection on a machined machining route, returning to a position where a wire is disconnected along the machining route and performing disconnection repairing for resuming electric discharge machining from a disconnection position of the wire electrode, electric-discharge machining a workpiece through electric discharge generated between the wire electrode and the workpiece, and depositing and accumulating machining wastes caused by the electric discharge machining to thereby fix a core generated by the electric discharge machining and the workpiece. The wire electric discharge machine can machine the workpiece along the machining route while controlling the respective moving axes and calculating coordinates of the respective moving axes and a machining distance according to a machining program.

Figure 2:
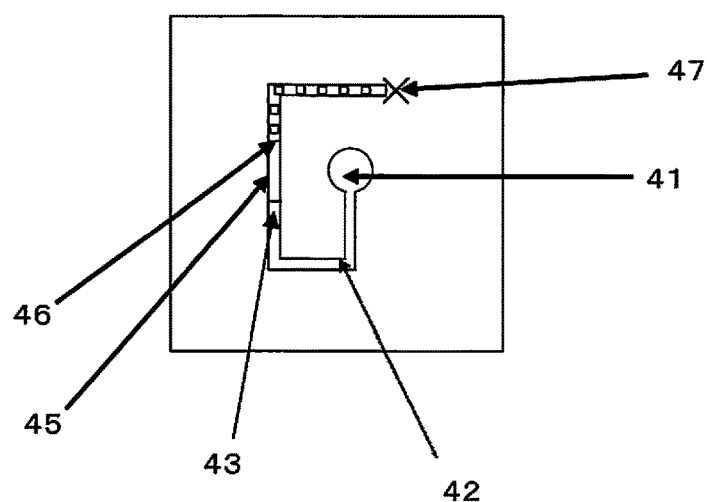
FIG. 2 is a diagram for explaining a method of disconnection repairing according to several embodiments of the present invention.

FIG. 2 is a diagram for explaining a method of disconnection repairing according to several embodiments of the present invention. In the several embodiments of the present invention, when disconnection occurs in the machining performed using the core fixing function and a disconnection repairing operation is started, in the wire electric discharge machine that performs the automatic connection on the machined machining route, the automatic connection by the disconnection repairing is performed between the disconnection position 47 and the core fixing end position 46. A method of determining whether the wire electrode has reached the core fixing position will now be explained.

First Embodiment

Figure 3:
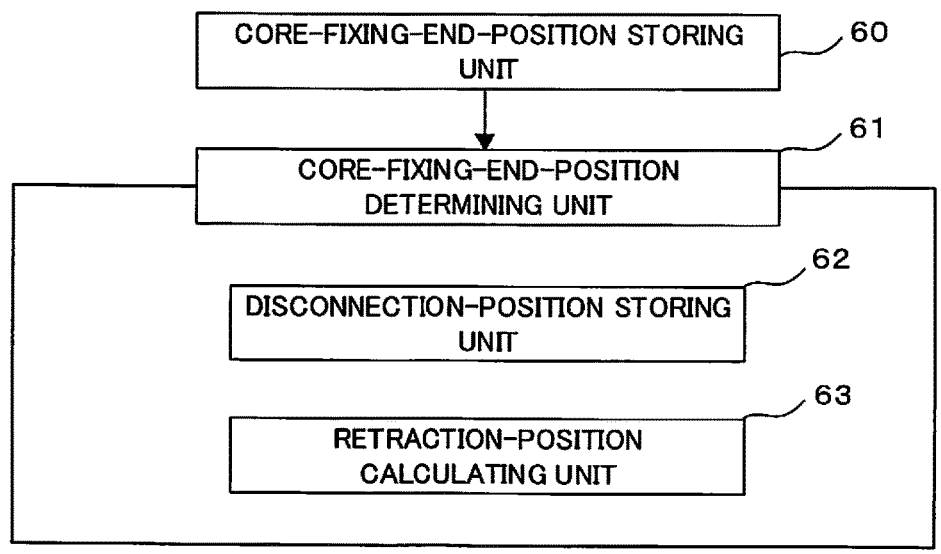
FIG. 3 is a block diagram according to a first embodiment.

A method of monitoring a retraction position viewed from a disconnection position and determining whether the wire electrode has reached the core fixing position FIG. 3 is a block diagram according to a first embodiment. A core-fixing-end-position storing unit 60 is unit for capturing a machining distance when a depositing and accumulating operation for machining wastes by the core fixing function ends and storing, as a core fixing end position, a machining distance of a position where the depositing and accumulating operation ends machined most lately among positions at which the depositing and accumulating operation for the machining wastes by the core fixing function ends in a machining shape currently being machined.

A core-fixing-end-position determining unit 61 includes a disconnection-position storing unit 62 and a retraction-position calculating unit 63. The core-fixing-end-position determining unit 61 is unit for determining, from the disconnection position, the retraction position, and the core fixing end position, whether the automatic connection position does not reach the core fixing end position and is present between the disconnection position and the core fixing end position.

The disconnection-position storing unit 62 is a unit for capturing a machining distance when disconnection occurs during the electric discharge machining and storing the machining distance as a disconnection position. The retraction-position calculating unit 63 is a unit for calculating, in retraction along the machining route by the disconnection repairing unit, a retraction position from the disconnection position and setting the calculated retraction position as a retraction position.

When the core fixing function is executed, a position where the depositing and accumulating operation for the machining wastes ends is stored in the core-fixing-end-position storing unit 60. A machining distance of an end position of the depositing and accumulating operation machined most lately among positions at which the depositing and accumulating operation for the machining wastes by the core fixing function ends in a machining shape currently being machined is stored. However, other position information such as a coordinate may be stored instead of the machining distance.

The core-fixing-end-position storing unit 60 passes the end position of the depositing and accumulating operation machined most lately among the positions at which the depositing and accumulating operation for the machining wastes by the core fixing function ends to the core-fixing-end-position determining unit 61 as the core fixing end position. The disconnection-position storing unit 62 stores a disconnection position on the machining route. A machining distance at the time when disconnection occurs during the electric discharge machining is stored. However, other position information such as a coordinate may be stored instead of the machining distance.

The retraction-position calculating unit 63 calculates a retraction position viewed from the disconnection position in the retraction along the machining route by the disconnection repairing unit. A retraction distance indicating a distance of retraction from the disconnection position during the retraction in the disconnection repairing is calculated. However, other position information such as a coordinate may be calculated instead of the distance.

Figure 4:
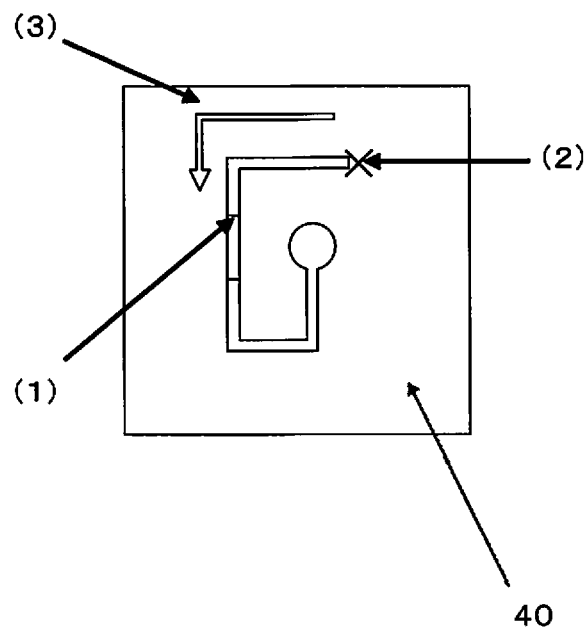
FIG. 4 is a diagram for explaining an example of determination of a core fixing end position in the first embodiment.

FIG. 4 is a diagram for explaining an example of determination of a core fixing end position in the first embodiment.

(1) A machining distance in the core fixing end position is stored.

(2) A machining distance in the disconnection position is stored.

(3) A retraction distance during the disconnection repairing is calculated.

(4) When ((the machining distance in the disconnection position)−(the machining distance in the core fixing end position))>the retraction distance or ((the machining distance in the disconnection position)−(the machining distance in the core fixing end position))/the retraction distance>1, it is determined that the automatic connection position is present between the disconnection position and the core fixing end position. On the other hand, when ((the machining distance in the disconnection position)−(the machining distance in the core fixing end position))≤the retraction distance or ((the machining distance in the disconnection position)−(the machining distance in the core fixing end position))/the retraction distance≤1, it is determined that the automatic connection position is absent between the disconnection position and the core fixing end position.

As explained above, the core-fixing-end-position determining unit 61 determines, from the disconnection position, the core fixing end position, and the retraction position, whether the automatic connection position does not reach the core fixing end position and is present between the disconnection position and the core fixing end position. Specifically, the core-fixing-end-position determining unit 61 calculates a difference between the machining distance in the disconnection position and the machining distance in the core fixing end position and compares the difference with the retraction distance. When the retraction distance is smaller than the difference between the machining distance in the disconnection position and the machining distance in the core fixing end position, the core-fixing-end-position determining unit 61 can determine that the automatic connection position is present between the disconnection position and the core fixing end position. When the retraction distance is equal to or larger than the difference between the machining distance in the disconnection position and the machining distance in the core fixing end position, the core-fixing-end-position determining unit 61 can determine that the automatic connection position is absent between the disconnection position and the core fixing end position. The core-fixing-end-position determining unit 61 may perform the determination using a ratio or may perform the determination using other position information such as a coordinate.

Second Embodiment

Figure 5:
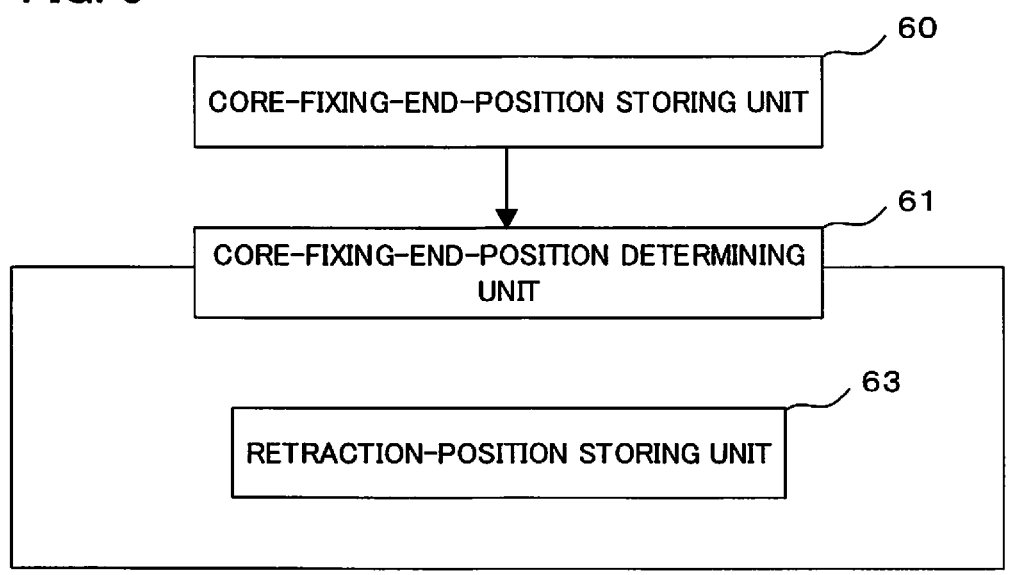
FIG. 5 is a block diagram according to a second embodiment.

A method of monitoring a machining position during retraction and determining whether the wire electrode has reached the core fixing position FIG. 5 is a block diagram according to a second embodiment. The core-fixing-end-position storing unit 60 is a unit for capturing a machining distance when a depositing and accumulating operation for machining wastes by the core fixing function ends and storing, as a core fixing end position, a machining distance of a position where the depositing and accumulating operation ends machined most lately among positions at which the depositing and accumulating operation for the machining wastes by the core fixing function ends in a machining shape currently being machined.

The core-fixing-end-position determining unit 61 includes the retraction-position storing unit 63. The core-fixing-end-position determining unit 61 is a unit for determining, from the retraction position and the core fixing end position, whether the automatic connection position does not reach the core fixing end position and is present between the disconnection position and the core fixing end position. The retraction-position storing unit 63 is a unit for capturing a machining distance (a distance from a machining start point) in retraction along the machining route by the disconnection repairing unit and storing the machining distance as the retraction position.

When the core fixing function is executed, a position where the depositing and accumulating operation for the machining wastes ends is stored in the core-fixing-end-position storing unit 60. A machining distance of an end position of the depositing and accumulating operation machined most lately among positions at which the depositing and accumulating operation for the machining wastes by the core fixing function ends in a machining shape currently being machined is stored. However, other position information such as a coordinate may be stored instead of the machining distance.

The core-fixing-end-position storing unit 60 passes the end position of the depositing and accumulating operation machined most lately among the positions at which the depositing and accumulating operation for the machining wastes by the core fixing function ends to the core-fixing-end-position determining unit 61 as the core fixing end position.

The retraction-position storing unit 63 stores a retraction position in the retraction along the machining route by the disconnection repairing unit. A machining distance from a machining start point is stored as the retraction position. However, other position information such as a coordinate may be stored instead of the machining distance.

Figure 6:
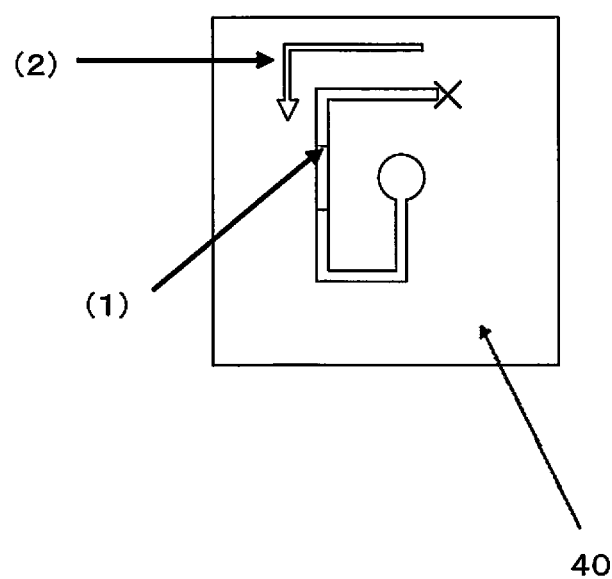
FIG. 6 is a diagram for explaining an example of determination of a core fixing end position in the second embodiment.

FIG. 6 is a diagram for explaining an example of determination of a core fixing end position in the second embodiment.

(1) A machining distance in the core fixing end position is stored.

(2) A machining distance during disconnection repairing retraction is monitored.

(3) When (the machining distance in the core fixing end position)<(the machining distance during the disconnection repairing retraction) or (the machining distance in the core fixing end position)/(the machining distance during the disconnection repairing retraction)<1, it is determined that the automatic connection position is present between the disconnection position and the core fixing end position. On the other hand, when (the machining distance in the core fixing end position)≥(the machining distance during the disconnection repairing retraction) or (the machining distance in the core fixing end position)/(the machining distance during the disconnection repairing retraction)≥1, it is determined that the automatic connection position is absent between the disconnection position and the core fixing end position.

The core-fixing-end-position determining unit 61 determines, from the core fixing end position and the retraction position, whether the automatic connection position does not reach the core fixing end position and is present between the disconnection position and the core fixing end position. Specifically, the core-fixing-end-position determining unit 61 compares the machining distance during the retraction by the disconnection repairing unit and the machining distance in the core fixing end position. When the machining distance during the retraction by the disconnection repairing unit is larger than the machining distance in the core fixing end position, the core-fixing-end-position determining unit 61 can determine that the automatic connection position is present between the disconnection position and the core fixing end position. When the machining distance during the retraction by the disconnection repairing unit is equal to or smaller than the machining distance in the core fixing end position, the core-fixing-end-position determining unit 61 can determine that the automatic connection position is absent between the disconnection position and the core fixing end position. The core-fixing-end-position determining unit 61 may perform the determination using a ratio or may perform the determination using other position information such as a coordinate.

Figure 7:
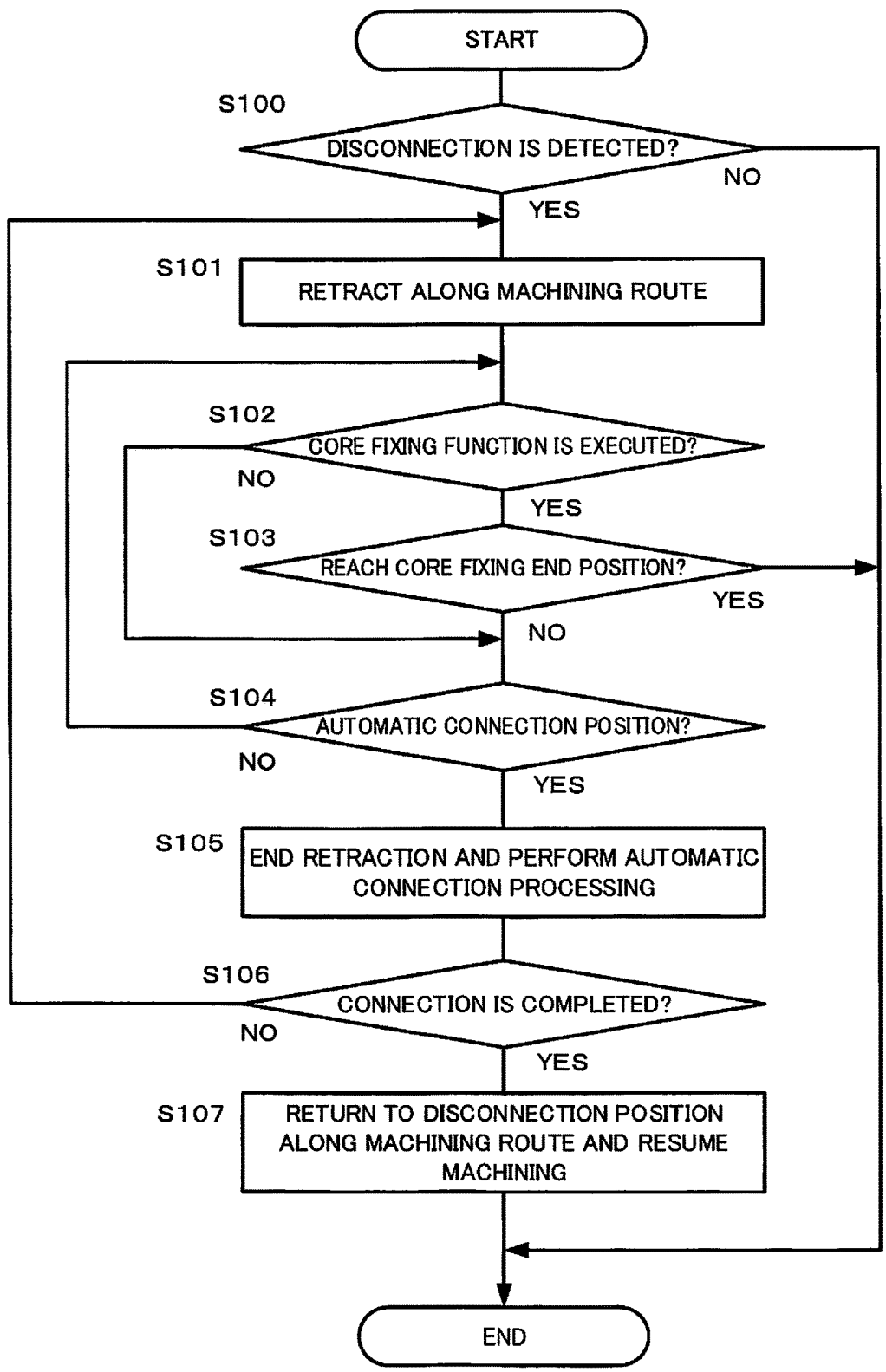
FIG. 7 is a flowchart showing processing according to the present invention.
Figures 8, 9:
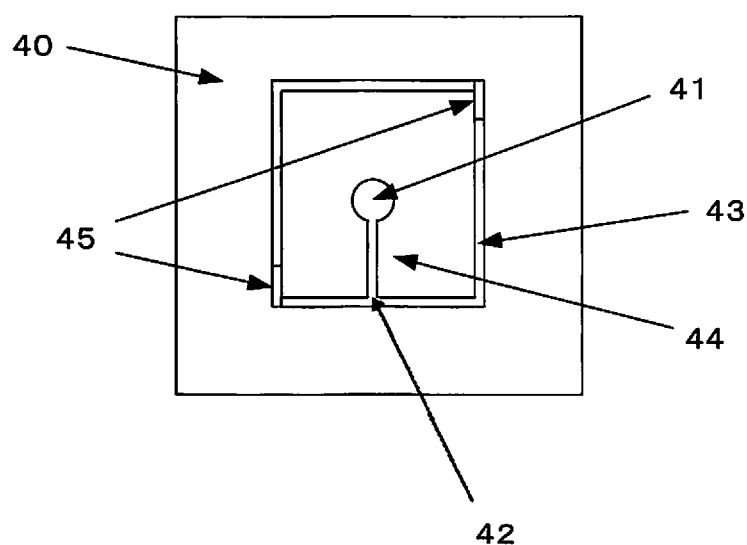
FIG. 8 is a program example in operating a core fixing function according to a command by an NC program.
FIG. 9 is a diagram showing an example of a machining result obtained when the core fixing function is operated according to the command by the NC program.
Figure 10:
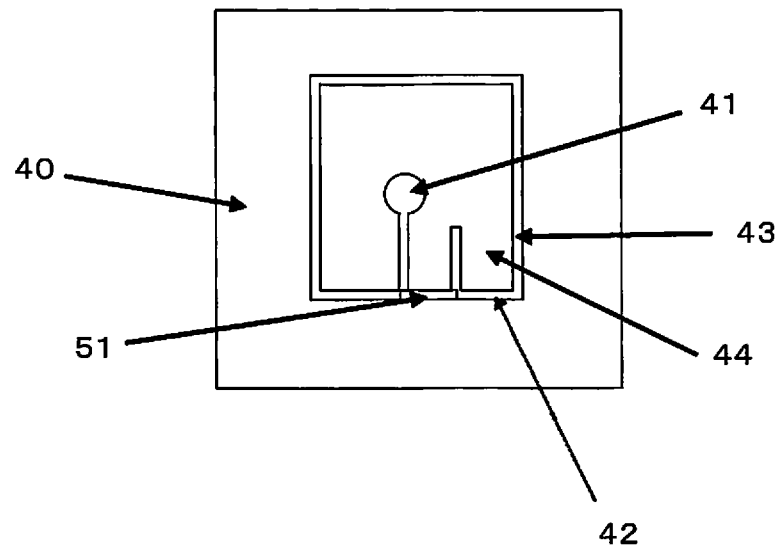
FIG. 10 is a diagram showing an example of a machining result obtained when a residual stock removal section is provided to perform machining.
Figure 11:
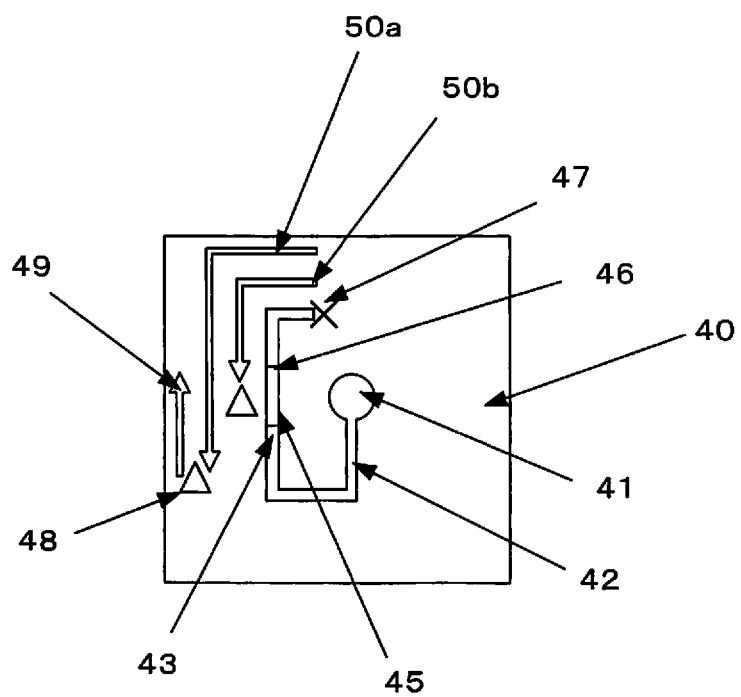
FIG. 11 is a diagram for explaining disconnection repairing performed when the core fixing function is used.
Figure 12A:
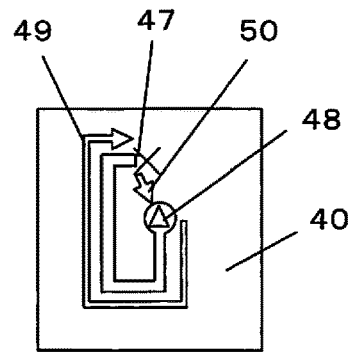
FIGS. 12A, 12B, and 12C are diagrams showing disconnection repairing by conventional disconnection repairing unit.
Figure 12B:
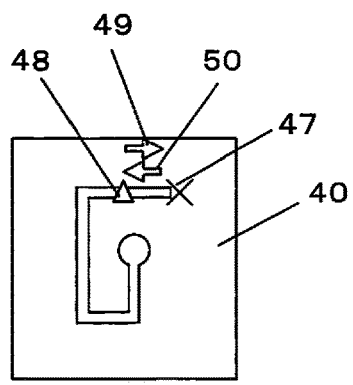
Figure 12C:
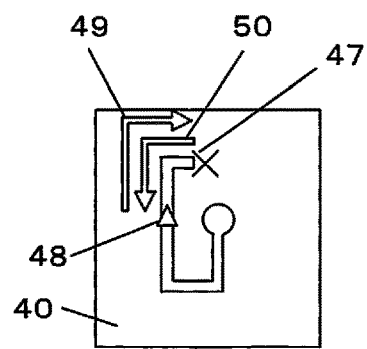

FIG. 7 is a flowchart explaining processing performed when disconnection occurs during electric discharge machining in the machining performed using the core fixing function. The processing will be explained according to respective steps below.

[S100] Detect whether the wire electrode is disconnected. When disconnection is detected, shift to S101. When disconnection is not detected, end the processing.

[S101] Start retraction along the machining route and shift to S102.

[S102] Determine whether the core fixing function is executed in a present machining shape. When the core fixing function is executed (YES), shift to S103. When the core fixing function is not executed (NO), continue the retraction and shift to S104. Note that, in this embodiment, a flag is set when the core fixing function is executed. The flag is discriminated to determine whether the core fixing function is executed in the present shape. The flag is designed to be cleared when a setting command (e.g., G92) for the machining start point is executed in a program.

[S103] Determine whether the automatic connection position reaches the core fixing end position during the retraction. When the automatic connection position reaches the core fixing end position (YES), end the retraction and end the processing. When a connection command is present prior to display of an alarm or a program position during the disconnection, machining may be skipped to a position of the connection command and resumed from the connection command position. When the automatic connection position does not reach the core fixing end position (NO), continue the retraction and shift to S104. Note that unit for determining whether the automatic connection position reaches the end position of the core fixing position is as explained above.

[S104] Determine whether the present position is the automatic connection position. When the present position is the automatic connection position (YES), shift to S105. When the present position is not the automatic connection position (NO), continue the retraction and shift to S102. Note that the automatic connection position in this embodiment is any of (1) a position a fixed distance or more apart from the retraction start position and (2) the machining start position. The operation for retracting to the automatic connection position and performing the automatic connection is publicly known from Japanese Patent Laid-Open No. 2011-136409.

[S105] End the retraction and perform automatic connection processing. When the automatic connection processing ends, shift to S106.

[S106] Determine whether connection is completed. When the connection is completed, shift to S107. When the connection is not completed, shift to S101 and start the retraction again.

[S107] Return to the disconnection position along the machining route and resume the machining and end the processing.

What is claimed is:

1. A wire electric discharge machine, comprising:
   an upper wire electrode guide and a lower wire electrode guide;
   a wire electrode fusing mechanism; and
   a controller which
      controls electric discharge machining of a workpiece by electric discharge generated between the workpiece and a wire electrode while the wire electrode is being guided by the upper and lower wire electrode guides to move relative to the workpiece along a machining route according to a machining program,
      performs a core fixing in a depositing and accumulating operation by the electric-discharge machining of the workpiece, and depositing and accumulating machining wastes caused by the electric discharge machining in a machined groove to thereby fix (i) a core cut by the electric discharge machining from the workpiece to (ii) a remaining portion of the workpiece,
      stores a core fixing end position where the depositing and accumulating operation performed most lately, among a plurality of positions at which the depositing and accumulating operation is performed, ends, and
      when the wire electrode is disconnected during the electric discharge machining at a disconnection position on the machining route,
         controls the wire electrode fusing mechanism to perform automatic connection of the wire electrode at a position on the machining route between the disconnection position and the stored core fixing end position, and thereafter
         returns the wire electrode to the disconnection position and resumes the electric discharge machining from the disconnection position,
   wherein the controller further
      determines whether an automatic connection position is present between the disconnection position and the stored core fixing end position, and
      controls the wire electrode fusing mechanism to perform the automatic connection at the automatic connection position, in response to determining that the automatic connection position is present between the disconnection position and the stored core fixing end position.

2. The wire electric discharge machine according to claim 1, further comprising:
   a display that displays an alarm in response to the controller determining that the automatic connection position is absent between the disconnection position and the stored core fixing end position.

3. The wire electric discharge machine according to claim 1, wherein
   the controller skips the electric discharge machining to a connection command position and resumes the electric discharge machining from the connection command position, in response to determining that
      the automatic connection position is absent between the disconnection position and the stored core fixing end position, and
      the connection command position is present ahead of a program position during disconnection of the wire electrode.

4. The wire electric discharge machine according to claim 1, wherein
the controller
stores the disconnection position on the machining route where the wire electrode is disconnected during the electric discharge machining,
calculates a retraction position to which the wire electrode is retracted along the machining route, and
determines, from the disconnection position, the stored core fixing end position, and the retraction position, whether the automatic connection position is present between the disconnection position and the stored core fixing end position.

5. The wire electric discharge machine according to claim 1, wherein
the controller
stores a retraction position to which the wire electrode is retracted along the machining route, and
determines, from the stored core fixing end position and the retraction position, whether the automatic connection position is present between the disconnection position and the stored core fixing end position.

6. A wire electric discharge machine, comprising:
an upper wire electrode guide and a lower wire electrode guide;
a wire electrode fusing mechanism; and
a controller which
controls electric discharge machining of a workpiece by electric discharge generated between the workpiece and a wire electrode while the wire electrode is being guided by the upper and lower wire electrode guides to move relative to the workpiece along a machining route according to a machining program,
performs a core fixing in a depositing and accumulating operation by the electric-discharge machining of the workpiece, and depositing and accumulating machining wastes caused by the electric discharge machining in a machined groove to thereby fix (i) a core cut by the electric discharge machining from the workpiece to (ii) a remaining portion of the workpiece,
stores a core fixing end position where the depositing and accumulating operation performed most lately, among a plurality of positions at which the depositing and accumulating operation is performed, ends, and
when the wire electrode is disconnected during the electric discharge machining at a disconnection position on the machining route,
controls the wire electrode fusing mechanism to perform automatic connection of the wire electrode at a position on the machining route between the disconnection position and the stored core fixing end position, and thereafter
returns the wire electrode to the disconnection position and resumes the electric discharge machining from the disconnection position,
wherein the controller further
retracts the wire electrode from the disconnection position along the machining route and then controls the wire electrode fusing mechanism to perform the automatic connection, and
when the automatic connection is not performable, further repeats an operation for retracting along the machining route and performing the automatic connection.

* * * * *